United States Patent Office 3,808,275
Patented Apr. 30, 1974

3,808,275
PROCESS FOR PRODUCING OXIMES
Toshiro Hirose and Takashi Matsubara, Nagoya, Japan, assignors to Toagosei Chemical Industry Co., Ltd., Tokyo, Japan
No Drawing. Filed Mar. 23, 1971, Ser. No. 127,350
Claims priority, application Japan, Mar. 25, 1970, 45/24,459; Mar. 27, 1970, 45/25,290
Int. Cl. C07c 131/00
U.S. Cl. 260—566 A
12 Claims

ABSTRACT OF THE DISCLOSURE

A high-purity ketoxime can be obtained in a high yield (high conversion and high selectivity) by reacting at least one ketone with hydroxylamine or a salt thereof in the presence of a tin-containing compound, even when the pH of the reaction system is 6 or higher.

---

The present invention relates to a process for synthesizing oxime by reacting at least one ketone or aldehyde with hydroxylamine or a salt thereof (hereinafter referred to simply as hydroxylamine), and more particularly, relates to a process for producing an oxime, which is characterized by conducting said reaction in the presence of a tin-containing compound.

Heretofore, methods for synthesizing an oxime by the reaction of a ketone or an aldehyde with hydroxylamine have been known in the art. For instance, it has been known that the rate of reaction of a ketone with hydroxylamine varies in a wide range depending upon the structure of the ketone (see, for example, J. Amer. Chem. Soc., 78, 530), as well as upon the pH of the reaction mixture (see, for example, J. Amer. Chem. Soc., 81, 475). For example, in synthesizing cyclohexanoneoxime from cyclohexanone, the optimum pH is 2.5 to 4 (U.S. Pats. Nos. 2,270,204 and 2,820,825), whereas in synthesizing cyclododecanoneoxime from cyclododecanone, a high conversion of the latter is difficult to obtain at pH values of 1 to 4, a high conversion being able to be obtained only when the pH is 6 or higher (cf., Japanese patent publication No. 24,885/64).

Further, there have been reported several methods for synthesizing an aldoxime by the reaction of a corresponding aldehyde with hydroxylamine. However, in every case reported, a condensation of the aldehyde or other side reactions occur under the reaction conditions, so that the aldoxime has never been obtained in high yields, the selectivity for oximes from aldehydes having been at most about 80%.

On the other hand, it is reported that hydroxylamine becomes unstable in an alkaline solution [for example, Mellor, Inorganic Chemistry, p. 580 (1953); Kirk-Othmer, Encyclopedia of Chemical Technology, 7, p. 764 (1951); Gmerins, Handbuch der Anorganischen Chemie, Nr. 23, p. 570–596 (1936)]. For example, when the reaction of a ketone with hydroxylamine is conducted at a pH higher than 6, the amount of hydroxylamine required for a given amount of the ketone becomes larger, resulting in a remarkable decrease in yield based on hydroxylamine, and in discoloration and contamination of the oxime. The discoloration and contamination of oxime bring about contamination of a lactam when the latter or an acid amide is prepared by the Beckmann rearrangement of the oxime, and consequently, the production of an industrially valuable polyamide and other products becomes impossible. Moreover, a marked decrease in yield on the basis of hydroxylamine results in an increase of production cost of the ketoxime, which is economically disadvantageous.

An object of the present invention is to provide a process free from the above-said disadvantages for producing a high-quality oxime from a ketone or an aldehyde and hydroxylamine while decomposition of the latter is prevented.

The present inventors made extensive studies in order to achieve the said object, and, as a result thereof, have found that when the reaction of at least one ketone or aldehyde with hydroxylamine into a corresponding oxime is effected in the presence of a tin-containing compound, high conversions and high oxime selectivities to both ketone or aldehyde and hydroxylamine can be obtained. Based on this finding, the present invention has been accomplished. The present inventors have also found an unexpected fact that the presence of said tin-containing compound does not interfere with the oximation reaction.

With respect to ketones for use in this invention, there is no special limitation, but ptrticularly favorable results are obtained with cycloalkanones having 8 or more, particularly 10 or more carbon atoms such as, for example, cyclododecanone, cyclodecanone, cyclooctanone, etc., which are unable to give high conversions at a pH of less than 6 in conventional processes. The present process can also be applied effectively to the oximation of other ketones, especially those which have a bulky substituent at the position of $\alpha$ or $\alpha,\alpha'$ with respect to the ketone group, such as, for example, methyl isobutyl ketone, diisobutyl ketone, acetophenone, etc., and those which are sparingly soluble in water and especially require higher reaction temperatures, such as, for example, aliphatic straight-chain ketones having 10 or more carbon atoms. The ketones may be used alone or in combination.

With respect to aldehydes for use in this invention, there is also no special limitation, and there may be used such aldehydes as, for example, propionaldehyde, n-butyraldehyde, isobutyraldehyde, benzaldehyde, furfural, crotonaldehyde, salicylaldehyde, etc. The present process is also effectively applicable to the oximation of such aldehydes as are susceptible to side reactions such as polymerization and condensation. The aldehydes may be used alone or in combination.

Regarding hydroxylamine for use in the present process, there is also no special restriction, but the present process is particularly advantageous when applied to the case where there is used a hydroxylamine prepared by the Raschig method, or a hydroxylamine solution prepared by catalytically reducing nitrogen monoxide in an aqueous acidic solution.

The salts of hydroxylamine for use in the present process include salts with such acids as HCl, HBr, $H_2SO_4$, $H_3PO_4$, and $HNO_3$, among which the salt with HCl or $H_2SO_4$ is preferred.

The tin-compounds for use in the present process include tin dioxide ($SnO_2 \cdot nH_2O$); tin hydroxides such as stannous hydroxide [$Sn(OH)_2$], and stannic oxyhydroxide [$Sn(OH)_2$]; stannous acid ($HSnO_2H$) and salts thereof with sodium, potassium, lithium, ammonium, etc.; orthostannic acid ($H_2SnO_3 \cdot H_2O$), metastannic acid ($H_2SnO_5 \cdot 4H_2O$), parastannic acid ($H_2Sn_5O_{11} \cdot 7H_2O$), and salts of these acids with sodium, potassium, lithium, ammonium, etc., such as, for example, sodium $\alpha$-stannate ($Na_2SnO_3 \cdot 3H_2O$), sodium $\beta$-stannate ($Na_2O \cdot 5SnO_2 \cdot 8H_2O$)

potassium orthostannate ($K_2SnO_3 \cdot 3H_2O$), potassium metastannate ($K_2Sn_5O_{11} \cdot 4H_2O$); inorganic tin compounds such as stannic chloride ($SnCl_4 \cdot nH_2O$), stannous sulfate ($SnSO_4$), stannic sulfate [$Sn(SO_4)_2 \cdot 2H_2O$], tristannous n-phosphate [$Sn_3(PO_4)_2$]; and organotin compounds such as trialkyltin, The suitable amount of a tin-containing compound to be used is 0.0001 to 0.1 part by weight per part by weight of hydroxylamine used.

The reaction is preferably carried out in an aqueous medium, but can be carried out in the presence of an organic solvent which forms a heterogenous system with water, such as, for example, cyclohexane, methylcyclohexane, hydrocumene, benzene, toluene, xylene, carbon tetrachloride, choloform, tetrachloroethane, etc., or in the presence of an organic solvent which forms a homogeneous system with water, such as, isopropanol, tetrahydrofuran, pyridine, dioxane, ethanol, etc.

The reaction temperature is generally 30° to 150° C., preferably 50° to 130° C. in the case of ketones, while it is preferably 20° to 120° C. in the case of aldehydes, though may vary depending upon the kinds of ketones and aldehydes. At too low a temperature, a satisfactory reaction rate is unattainable, whereas at too high a temperature, decomposition of the starting hydroxylamine and the product oximes takes place.

The suitable pH of the reaction system is 6 or higher, preferably 6 to 12 at the end of the reaction with a ketone as the starting material, and preferably 3 to 7 with an aldehyde as the starting material.

To regulate the pH value, there may be used inorganic compounds such as ammonia, sodium hydroxide, potassium hydroxide, sodium carbonate, potassium carbonate, etc., and organic basic compounds such as triethylamine, cyclohexylamine, etc.

The suitable reaction pressure ranges from atmospheric pressure to about 10 kg./cm.$^2$.

A reaction time of 20 minutes to 6 hours is sufficient. The reaction may be conducted either batchwise or continuously.

As explained in the foregoing, according to the present process, a higher conversion and a higher oxime selectivity from both hydroxylamine and ketone or aldehyde are obtained than by the conventional process, and, in addition, the prevention of discoloration and contamination of the oxime produced is made possible. Further, in the present process, an abnormal decomposition reaction is prevented to such an extent that the safe operation is possible, and also reuse of unreacted hydroxylamine by recycling is made possible. Thus, the present process is extremely useful from an industrial viewpoint.

According to the observation made by the present inventors, when the aforementioned tin-containing compound is present in a solution containing hydroxylamine or its salt, said solution becomes markedly stabilized.

Generally, when existing as a salt with a mineral acid such as hydrochloric acid, sulfuric acid, or nitric acid, hydroxylamine is a relatively stable compound, and can be stored for a long time in an aqueous acidic solution. However, as mentioned above, the stability tends to decrease, with an increase of the pH of the solution, and at a pH of 5 or more, particularly at a pH of 6 or more, hydroxylamine in the solution becomes unstable and gradually decomposes even at room temperature, so that the solution cannot stand a long storage. Even in the form of a mineral acid salt or in an acidic solution, the decomposition of hydroxylamine is accelerated by the presence of a heavy metal such as iron or cobalt, or by temperature increase [cf., for example, Mellor, Inorganic Chemistry, vol. 8, 300 (1928)]. Decomposition products include ammonia, nitrous oxide, nitrogen, and water depending upon the conditions of decomposition.

However, if a tin-containing compound is present in said hydroxylamine solution, the decomposition due to the above-said causes is effectively inhibited, and the stabilizing effect becomes more marked, especially in the presence of an alkali (pH $\geq$6) or at higher temperatures ($\geq$60° C.). The amount of tin-containing compound to be used is preferably 0.0001 to 0.1 part by weight per part by weight of hydroxylamine (as $NH_2OH$).

The above-said stabilizing method for hydroxylamine is applicable to any of hydroxylamine solutions prepared by the various methods mentioned above or by using purified hydroxylamine isolated by crystallization. By use of said stabilizing method, it becomes possible to increase the yield of hydroxylamine in its synthesis, to store hydroxylamine solution for a longer period, and to enhance the yields in various reactions in which hydroxylamine participates.

The invention is hereinafter illustrated in further detail with reference to examples and comparative examples. Further, the stabilizing effect of tin-containing compounds upon hydroxylamine is illustrated by reference to reference examples. The utilization degree referred to in Examples 8 to 10 and Comparative Examples 4 and 5 was calculated according to the following equation:

Utilization rate of hydroxylamine (percent)

$$= \frac{\text{Oxime formed (mol)}}{\text{Hydroxylamine supplied (mol)}} \times 100$$

The results obtained concerning the synthesis of ketoxime are summarized in Table 1.

EXAMPLE 1

Into a 500-cc. glass reactor provided with a stirrer and a condenser were charged 43.2 g. of hydroxylamine sulfate ($NH_2OH \cdot \frac{1}{2}H_2SO_4$), 200 g. of water, 0.1 g. of sodium $\alpha$-stannate, and 91 g. of cyclododecanone, into which gaseous ammonia was blown at a rate of 160 cc./min., and the mixture was subjected to reaction at 98° C. for 2 hours while being stirred. During this period of time, the pH values varied as follows:

Reaction time (min.):                    pH

0 _____ 2.4
  20 _____ 4.6
  40 _____ 6.3
  60 _____ 7.8
120 _____ 7.9

Crystals were separated from the reaction liquid, washed with water, and dried to obtain 97.5 g. of crude white cyclododecanoneoxime. Analysis of the product by gas chromatography revealed that the product contained 1.8% by weight of cyclododecanone, and the balance was cyclododecanoneoxime. 314.5 grams of a mixture of the water washings and the mother liquor separated from the crystals was subjected to analysis of hydroxylamine, and the content of the latter was found to be 0.2% by weight in terms of $NH_2OH$. Consequently, it was found that the selectivity from hydroxylamine to oxime was 94.5 mole percent, the conversion of cyclododecanone 98.1%, and the selectivity from cyclododecanone to cyclododecanoneoxime 99.2 mole percent.

EXAMPLE 2

Into a flask provided with a stirrer and a condenser were charged 200 g. of a hydroxylamine solution having the composition shown hereunder, 0.2 g. of sodium $\alpha$-stannate, and 46.7 g. of cyclododecanone, and the mixture was subjected to reaction at 100° C., for 2 hours while being neutralized with a 20% aqueous sodium hydroxide solution to maintain the pH at 8.0.

Percent by weight

Hydroxylamine (as $NH_2OH \cdot \frac{1}{2}H_2SO_4$) _____ 12.6
Sulfuric acid _____ 8.6
Ammonium sulfate _____ 22.0
Ammonium nitrate _____ 1.5
Water _____ 54.3
Others _____ 1.0

To the reaction mixture containing white solids, was added 300 g. of benzene to dissolve and extract the solids. The benzene layer was analyzed for cyclododecanone and cyclododecanoneoxime, and the aqueous layer for hydroxylamine. The results obtained were as follows:

Conversion of cyclododecanone: 96.8 mole percent

Cyclododecanoneoxime selectivity (on reacted cyclododecanone): 99.0 mole percent
Cyclododecanoneoxime selectivity (on reacted hydroxylamine): 94.8 mole percent
Conversion of hydroxylamine: 84.0%

EXAMPLES 3-7

To a 500-cc. reactor provided with a stirrer and a condenser were charged 49.2 g. of hydroxylamine sulfate, 200 g. of water, a tin-containing compound, a ketone, and a solvent (if used), as shown in Table 1. The mixture was subjected to reaction at the boiling point of the mixture (85° to 100° C.) for 4 hours while passing therethrough a gaseous ammonia stream at a rate of 120 cc./min. The results obtained were as shown in Table 1 (Examples 3 to 7).

COMPARATIVE EXAMPLES 1-3

The same procedure as in Examples 1 to 3 was repeated except for the omission of the sodium stannate, to obtain the results shown as Comparative Examples 1-3, respectively, in Table 1.

All of the oximes obtained in Comparative Examples 1-3 were light yellow, and in particular, the color of oxime obtained in Comparative Example 3 was darker than those of others.

by weight of $NH_4NO_3$, and 0.8 g. of sodium stannate ($Na_2SnO_3 \cdot 3H_2O$). A gaseous ammonia stream was passed through the mixture at a rate of 2 liters/min., with thorough stirring, until the pH of the mixture was increased to 5. Then, 145 g. of n-butyraldehyde was added in 10 minutes, after which a gaseous ammonia stream was again passed through the mixture to bring the pH up to 6. The reaction was allowed to proceed for 1 hour, while maintaining the temperature at 40° to 50° C. Thereafter, the reaction mixture was treated in a manner similar to that in Example 8, to obtain the main distillate, which contained 143 g. of more than 99% purity n-butyraldoxime. The conversion of n-butyraldehyde was 100%, the n-butyraldoxime selectivity 97 mole percent, and the utilization rate of hydroxylamine 88%.

EXAMPLE 10

Into a 3-liter round-bottomed flask provided with a stirrer were changed 1610 g. of a hydroxylamine solution obtained by the Raschig method (of the same composition as in Example 9) and 1.0 g. of tin hydroxide [$Sn(OH)_2$]. A gaseous ammonia stream was passed through the mixture at a rate of 2 liters/min., with thorough stirring, until the pH of the mixture was increased to 5. Then, 232.3 g. of benzaldehyde was added in

TABLE 1

| | Tin-containing compound | | Cycloalkanone | | Solvent | | Conversion of ketone, percent | Oxime selectivity, mole percent | |
|---|---|---|---|---|---|---|---|---|---|
| | Name | Amount (g.) | Name | Amount (g.) | Name | Amount (g.) | | From hydroxylamine | From ketone |
| Example: | | | | | | | | | |
| 1 | Sodium α-stannate | 0.1 | Cyclododecanone | 91.0 | | | 98.1 | 94.5 | 99.2 |
| 2 | do | 0.2 | do | 46.7 | | | 96.8 | 94.8 | 99.0 |
| 3 | Sodium β-stannate | 0.3 | do | 91.1 | Isopropanol | 50 | 98.1 | 96.4 | 99.0 |
| 4 | Potassium metastannate | 0.05 | do | 91.1 | | | 97.5 | 92.7 | 98.0 |
| 5 | Orthostannic acid | 0.1 | do | 100.0 | | | 96.8 | 94.8 | 99.0 |
| 6 | Sodium α-stannate | 0.3 | Cyclooctanone | 63.0 | | | 95.6 | 95.2 | 98.0 |
| 7 | do | 0.2 | Cyclodecanone | 80.0 | | | 96.5 | 95.8 | 96.8 |
| Comparative Example: | | | | | | | | | |
| 1 | | | Cyclododecanone | 91.0 | | | 94.6 | 87.3 | 98.3 |
| 2 | | | do | 46.7 | | | 71.3 | 65.7 | 98.0 |
| 3 | | | do | 91.1 | Isopropanol | 50 | 93.5 | 81.3 | 98.8 |

EXAMPLE 8

Into a 1-liter three-necked round-bottomed flask provided with a stirrer were added 168 g. of crystalline hydroxylamine sulfate (98% purity), 400 g. of water, and 0.8 g. of metastannic acid ($H_2SnO_3$). To the mixture was added 145 g. of n-butyraldehyde over a period of 10 minutes while being stirred thoroughly at room temperature. After the addition, a gaseous ammonia stream was passed through the mixture at a rate of 2 liters/min. until the pH of the reaction mixture was increased to 6. Then the mixture was heated to 40° to 50° C., and the reaction was continued for one hour. After completion of the reaction, the mixture was cooled to a temperature of 10° to 15° C., and 50 g. of ammonium sulfate was added and dissolved in the mixture. The reaction mixture was transferred into a 1-liter separatory funnel and allowed to stand for 15 minutes, to be separated into two layers. 172 grams of the upper layer was distilled under vacuum to obtain, after cutting the initial distillate off, a distillate at 80° to 82° C./71 mm. Hg as the main distillate, which contained 145.1 g. of more than 99% purity n-butyraldoxime. The conversion of n-butyraldehyde was 100%, the n-butyraldoxime selectivity 98 mole percent, and the utilization rate of hydroxylamine 89%.

EXAMPLE 9

Into a 2-liter three-necked round-bottomed flask provided with a stirrer were charged 1610 g. of a hydroxylamine sulfate solution obtained by the Raschig method 11.2% by weight of $NH_2OH \cdot \frac{1}{2}H_2SO_4$, 8.2% by weight of free $H_2SO_4$, 22% by weight of $(NH_4)_2SO_4$, and 1.5%

10 minutes, while maintaining the temperature at 30° to 40° C., after which a gaseous ammonia stream was again passed through the mixture at a rate of 2 liters/min., to bring the pH of the solution to 7 to 8. The solution was heated to 40° to 50° C., and the reaction was allowed to continue for 60 minutes (while continually passing the gaseous ammonia stream therethrough). After completion of the reaction, 1.5 liters of benzene was added thereto mixed well, and the resulting mixture was allowed to stand to separate into an organic layer and an aqueous layer. 1570 grams of the organic layer was subjected to an analysis by a gas chromatography, to find that it contained 245 g. of benzaldoxime, and no benzaldehyde was detected. The conversion of benzaldehyde was 100%, the benzaldoxime selectivity 97.5 mole percent, and the utilization rate of hydroxylamine 86%.

COMPARATIVE EXAMPLE 4

Example 8 was repeated except that the metastannic acid was not added to obtain 121.3 g. of more than 99% purity n-butyraldoxime. The conversion of n-butyraldehyde was 95.3%, the n-butyraldoxime selectivity 80.3 mole percent, and the utilization rate of hydroxylamine 68.2%.

COMPARATIVE EXAMPLE 5

Example 9 was repeated except that the sodium stannate was not added to obtain 111.3 g. of more than 99% purity n-butyraldoxime. The conversion of n-butyraldehyde was 94.9%, the n-butyraldoxime selectivity 72.3 mole percent, and the utilization rate of hydroxylamine 62.6%.

REFERENCE EXAMPLE 1

Gaseous ammonia was introduced into a hydroxylamine solution obtained by the Raschig method and having the following composition, until the pH value reached 6.

|  | Percent by weight |
|---|---|
| $NH_2OH \cdot \frac{1}{2}H_2SO_4$ | 12.0 |
| $H_2SO_4$ | 8.6 |
| $(NH_4)_2SO_4$ | 22.0 |
| $NH_4NO_3$ | 1.4 |
| Water | 55.0 |
| Others | 1.0 |

The resulting solution contained 4.5% by weight of hydroxylamine (in terms of $NH_2OH$). To each 200 g. of said solution was added one of the various additives shown in Table 2, and the solution was stirred while maintaining the temperature at 95° C. Two hours and four hours after the addition of the additive, the solution was analyzed for hydroxylamine. The results obtained were as shown in Table 2.

TABLE 2

| Additive | | Concentration of hydroxylamine [1] (percent by weight) after— | |
|---|---|---|---|
| Name | Amount (g.) | 2 hours | 4 hours |
| Sodium α-stannate | 0.05 | 2.70 | 1.69 |
| Do | 0.16 | 2.72 | 1.68 |
| Do | 1.01 | 2.80 | 1.71 |
| Orthostannic acid | 0.12 | 2.80 | 1.93 |
| Potassium metastannate | 0.12 | 1.73 | 1.72 |
| None | | 1.12 | 0.26 |

[1] Concentration in terms of $NH_2OH$.

REFERENCE EXAMPLE 2

To each of the four portions of an aqueous solution of hydroxylamine sulfate (first grade reagent, 99.5% purity) was added an aqueous solution of sodium hydroxide to make four hydroxylamine solutions having pH values of 5, 7, 9 and 11, respectively. Each solution was stirred while maintaining the temperature at 95±2° C., and the concentration of hydroxylamine was determined in a manner similar to that in Reference Example 1 after 2 and 6 hours of heating to examine the stability of the solution. The results obtained were as shown in Table 3.

TABLE 3

| Additive | | | Concentration of hydroxylamine [1] (percent by weight) after— | | |
|---|---|---|---|---|---|
| Name | Amount (g.) | pH | 0 hr. | 2 hrs. | 6 hrs |
| None | | 11.0 | 4.93 | 2.30 | 0.37 |
| Sodium α-stannate | 0.12 | 11.0 | 4.93 | 3.56 | 1.75 |
| None | | 9.0 | 5.12 | 3.31 | 1.36 |
| Sodium α-stannate | 0.12 | 9.0 | 5.12 | 4.26 | 2.81 |
| None | | 7.0 | 5.16 | 3.53 | 1.76 |
| Sodium α-stannate | 0.12 | 7.0 | 5.16 | 4.37 | 2.89 |
| None | | 5.0 | 5.21 | 5.03 | 4.61 |
| Sodium α-stannate | 0.12 | 5.0 | 5.21 | 5.21 | 5.20 |

Concentration in terms of $NH_2OH$.

What is claimed is:

1. In a process for producing a corresponding oxime by reacting at least one ketone with hydroxylamine or a salt thereof, the improvement which comprises conducting said reaction at a temperature of 30 to 150° C. with the ultimate pH of the reaction system being 6 or more in the presence of 0.001 to 0.1 part by weight of a tin-containing compound selected from the group consisting of tin dioxide; stannous hydroxide; stannic oxyhydroxide; stannous acid and salts thereof with sodium, potassium, lithium, ammonium; orthostannic acid, metastannic acid, parastannic acid and salts of these acids with sodium, potassium, lithium, ammonium; inorganic tin compounds of chlorides, sulfates, phosphates; and trialkyl tin based on one part by weight of the hydroxylamine.

2. A process according to claim 1, wherein the ketone is at least one compound selected from the group consisting of cyclooctanone, cyclodecanone, cyclododecanone, methyl isobutyl ketone, diisobutyl ketone and acetophenone.

3. A process according to claim 1, wherein the tin-containing compound is selected from the group consisting of stannous hydroxide, orthostannic acid, metastannic acid, sodium α-stannate, sodium β-stannate and sodium metastannate.

4. A process according to claim 1, wherein the reaction is conducted at a temperature of 50° to 130° C.

5. A process according to claim 1, wherein the reaction pressure is atmospheric pressure to 10 kg./cm.²

6. A process according to claim 1, wherein the period of reaction is 20 minutes to 6 hours.

7. A process according to claim 1, wherein the reaction is conducted in an aqueous medium.

8. A process according to claim 7, wherein the medium contains an organic solvent which forms a heterogeneous system with water.

9. A process according to claim 7, wherein the medium contains an organic solvent which forms a homogeneous system with water.

10. A process according to claim 1, wherein the hydroxylamine is a hydroxylamine produced by the Raschig method.

11. A process according to claim 1, wherein the hydroxylamine is a hydroxylamine solution produced by catalytic reduction of nitrous oxide in an aqueous acidic solution.

12. A process according to claim 1, wherein the hydroxylamine salt is a salt with hydrochloric acid, hydrobromic acid, sulfuric acid, phosphoric acid or nitric acid.

References Cited

UNITED STATES PATENTS 3,265,733  8/1966  Doerfel et al. _____ 260—566 A
3,574,750  4/1971  Yasui et al. _____ 260—566 A JOSEPH E. EVANS, Primary Examiner G. A. SCHWARTZ, Assistant Examiner U.S. Cl. X.R.

260—347.7; 423—413